(12) United States Patent
Yasukawa

(10) Patent No.: US 7,683,887 B2
(45) Date of Patent: Mar. 23, 2010

(54) DISPLAY SYSTEM

(75) Inventor: Sadahiko Yasukawa, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 922 days.

(21) Appl. No.: 10/596,063

(22) PCT Filed: Sep. 22, 2004

(86) PCT No.: PCT/JP2004/013815

§ 371 (c)(1),
(2), (4) Date: May 26, 2006

(87) PCT Pub. No.: WO2005/052782

PCT Pub. Date: Jun. 9, 2005

(65) Prior Publication Data

US 2009/0015562 A1 Jan. 15, 2009

(30) Foreign Application Priority Data

Nov. 28, 2003 (JP) ............................. 2003-400385

(51) Int. Cl.
*G06F 3/041* (2006.01)
(52) U.S. Cl. ............... 345/173; 345/174; 178/18.01
(58) Field of Classification Search ............ 345/87, 345/173, 174, 204; 178/18.01–18.08
See application file for complete search history.

(56) References Cited

U.S. PATENT DOCUMENTS

| | | | | |
|---|---|---|---|---|
| 4,371,746 A * | 2/1983 | Pepper, Jr. | ............... | 178/18.05 |
| 6,057,903 A * | 5/2000 | Colgan et al. | ............... | 349/139 |
| 6,177,918 B1 * | 1/2001 | Colgan et al. | ................ | 345/87 |
| 6,204,897 B1 * | 3/2001 | Colgan et al. | ................ | 349/12 |
| 6,239,788 B1 * | 5/2001 | Nohno et al. | ............... | 345/173 |
| 6,882,338 B2 * | 4/2005 | Flowers | ...................... | 345/174 |
| 2002/0024624 A1 | 2/2002 | Takenaka | | |
| 2002/0180710 A1 * | 12/2002 | Roberts | ...................... | 345/173 |
| 2003/0011583 A1 * | 1/2003 | Yamazaki | ................... | 345/204 |
| 2003/0107556 A1 * | 6/2003 | Yamashita | .................. | 345/173 |

(Continued)

FOREIGN PATENT DOCUMENTS

JP 06-195167 A 7/1994

(Continued)

OTHER PUBLICATIONS

International Search Report issued in the corresponding International Application No. PCT/JP2004/013815, mailed on Jan. 11, 2005.

*Primary Examiner*—Amare Mengistu
*Assistant Examiner*—Premal Patel
(74) *Attorney, Agent, or Firm*—Keating & Bennett, LLP

(57) ABSTRACT

A touch-panel-integrated liquid crystal display device (display system) includes a liquid crystal display device, and a touch panel input device, provided on a liquid crystal panel of the liquid crystal display device, which has upper and lower electrodes (conductive thin plates) for detecting a position via which information is inputted from the outside. The display system includes a liquid crystal display device driving section for driving the liquid crystal display device and a noise canceling signal generator (signal application section) for applying, to the touch panel input device, a noise canceling signal having an amplitude and a phase that are equal to an amplitude and a phase of a driving signal applied from the liquid crystal display device driving section to the liquid crystal panel.

8 Claims, 7 Drawing Sheets

U.S. PATENT DOCUMENTS

2004/0239641 A1 * 12/2004 Takahata et al. ............ 345/173

FOREIGN PATENT DOCUMENTS

| | | | |
|---|---|---|---|
| JP | 11-327450 A | 11/1999 | |
| JP | 2002-341372 A | 11/2002 | |
| JP | 2003-167677 A | 6/2003 | |
| JP | 2003-295162 A | 10/2003 | |

* cited by examiner

DISPLAY SYSTEM

BACKGROUND OF THE INVENTION

1. Field of the Invention

The present invention relates to a display system in which a device including a conductive thin plate such as a touch panel is provided on a display device such as a liquid crystal display device so that the display device and the conductive thin plate are integrated with each other.

2. Description of the Related Art

An input device such as a touch panel which detects a point on a panel surface which point is touched with a pen or a finger includes a conductive sheet. Patent Document 1 (Japanese Unexamined Patent Publication No. 167677/2003 (Tokukai 2003-167677) discloses a touch-panel-integrated display device in which the input device and the display device such as a liquid crystal display device are combined with each other. The touch panel is electrically connected to a touch panel controller so as to detect a position via which information is inputted to the touch panel with a pen. Normally, the touch-panel-integrated display device is arranged so that the touch panel controller is completely independent from a driving circuit for driving the display device.

Recently, the above-mentioned touch-panel-integrated display device (display system) has been more widely used as a portable device, so that the display device has become thinner and lighter. Thus, there are tendencies to make the device thinner by making the glass constituting the touch panel thinner and to make the device lighter by using plastic instead of glass.

In a case of using such a touch panel, this raises the following problem: a driving signal of the display device influences the touch panel, so that the touch panel is vibrated, which results in noise. This noise is generated as follows. The display device or the touch panel is electrically charged by static electricity generated in the production step, sliding of the pen when in contact with the touch panel, friction generated in pressing the pen against the panel surface, exfoliation, and the like, and an electric charge thereof is influenced by the driving signal of the display device, so that a force which varies with the passage of time is generated. In a portable information terminal having a sound collecting function or a telephone function, the noise is audible, so that the foregoing problem is more noticeable.

There is presently known a technique for suppressing the occurrence of abnormal minute vibration or abnormal noise in a thinner liquid crystal display device (see Patent Document 2 (Japanese Unexamined Patent Publication No. 295162/2003 (Tokukai 2003-295162). However, it has not been reported or disclosed that any discovery or study has been made regarding the above-described problems with the display device provided with the device having the conductive sheet such as the touch panel. Thus, the inventors of the present application have not found any document which identifies or recognizes the above-described problems.

SUMMARY OF THE INVENTION

In order to overcome the problems described above, preferred embodiments of the present invention provide a device having a conductive thin plate and a display device that reduce the occurrence of noise, vibration, and audible noise in a display system, such as a touch-panel-integrated display device.

The inventors of the present invention diligently studied the problems described above. As a result of the diligent study, the inventors of the present invention found it possible to reduce noise, vibration, and audible noise by applying, to a touch panel input device, a noise canceling signal having an amplitude and phase that are equal to an amplitude and a phase of a driving signal applied to a display device such as a liquid crystal panel, which led to the development of the preferred embodiments of the present invention.

That is, in order to solve the problems described above, a display system according to a preferred embodiment of the present invention includes a display device and a device provided on a display section of the display device and having one or more conductive thin plates, and the display system includes a display device driving section for driving the display device, and a signal application section for applying to the device having one or more conductive thin plates a noise canceling signal having an amplitude and a phase that are equal to an amplitude and a phase of a driving signal applied from the display device driving section to the display device.

According to the foregoing arrangement, by applying a signal having an amplitude and a phase that are equal to an amplitude and a phase of a driving signal applied to the display device, it is possible to prevent an electric field exerted on the electric charge existing between the display device and the input device from varying with the passage of time.

Further, it is possible to prevent a force exerted to the display device and the conductive thin plate from varying with passage of time, so that the device including the display device and the conductive thin plate is free from any vibration. Furthermore, there is no vibration, so that air surrounding the device is free from any vibration. Thus, it is possible to reduce and minimize the occurrence of audible noise.

In the display system according to a preferred embodiment of the present invention, the device including the conductive thin plate may be an input device for detecting a position via which information is inputted from outside.

In addition to the foregoing arrangement, it is preferable to arrange the display system according to a preferred embodiment of the present invention so that the device having one or more conductive thin plates includes two conductive thin plates overlapping each other, and the noise canceling signal is applied to at least a conductive thin plate of the two conductive thin plates which is located closer to the display section of the display device.

The electric charge causing the audible noise is accumulated between the display section of the display device and the conductive thin plate positioned closer to the display section of the display device. Therefore, if the noise canceling signal for reducing the audible noise is applied to at least the conductive thin plate positioned closer to the display section of the display device, it is possible to effectively suppress the audible noise. Note that, it is preferable that the noise canceling signal is preferably applied to both the two conductive thin plates. As a result, it is possible to more effectively suppress the audible noise.

In addition to the foregoing arrangement, the display system according to a preferred embodiment of the present invention may be arranged so that the input device includes an input device control section to which a detection signal for detecting a position via which information is inputted from outside to the conductive thin plate, and a signal switching section for selecting either the noise canceling signal or the detection signal so as to input the selected signal to the conductive thin plate.

According to the foregoing arrangement, it is possible to selectively carry out the control of the input device and the application of the noise canceling signal to the conductive thin plate of the input device. For example, in a case of the touch-panel-integrated display device, it is possible to selectively carry out detection of a position via which information is inputted to the touch panel input device and application of the noise canceling signal to the touch panel so as to reduce vibration of the touch panel.

As a result, it is possible to reduce the audible noise while keeping the function of the touch panel.

In addition to the foregoing arrangement, the display system according to a preferred embodiment of the present invention may be arranged so that the signal switching section switches the noise canceling signal to the detection signal or switches the detection signal to the noise canceling signal in accordance with whether or not information is inputted from outside to the conductive thin plates.

According to the foregoing arrangement, it is possible to selectively carry out the control of the input device and the application of the noise canceling signal to the conductive thin plate of the input device in accordance with whether or not information is inputted from the outside to the conductive thin plate of the input device. For example, in a case of the touch-panel-integrated display device, the touch panel and the input device control section are connected to each other so as to allow for detection of a position via which information is inputted when information is inputted to the touch panel, and the noise canceling signal is applied to the touch panel when no information is inputted to the touch panel. In this manner, it is possible to selectively carry out the detection of the position via which information is inputted and application of the noise canceling signal for preventing occurrence of the audible noise.

As a result, it is possible to automatically carry out switching operation of the switch.

In addition to the foregoing arrangement, the display system according to a preferred embodiment of the present invention may be arranged such that in a case where the display system is provided on a device having a telephone function and/or a sound collecting function, the signal switching section selects the noise canceling signal in using the telephone function and/or the sound collecting function so as to input the noise canceling signal to the conductive thin plate.

According to the foregoing arrangement, in the case of using the telephone function and/or the sound collecting function, it is possible to apply the noise canceling signal for preventing the occurrence of the audible noise to the conductive thin plate of the input device. Therefore, it is possible to prevent the occurrence of audible noise while talking on the phone, and this makes it easier to hear the sound (voice) of the speaker. Further, it is possible to prevent the audible noise caused by the noise of the conductive thin plate from being mixed in collecting sound. Note that, an example of the "sound collecting function" is a microphone provided on a portable information terminal which can record external sound.

In addition to the foregoing arrangement, the display system according to a preferred embodiment of the present invention may be arranged so that the input device further includes a conversion circuit for converting an amplitude of the noise canceling signal before inputting the noise canceling signal to the input device control section.

According to the foregoing arrangement, it is possible to adjust an amplitude of the noise canceling signal to an amplitude corresponding to an input voltage level of the input device control section. As a result, even in the case where the amplitude of the noise canceling signal applied to the input device is larger than an amplitude of a signal which can be inputted to the input device control section, it is possible to change the amplitude. Thus, it is possible to avoid the possibility that if a noise canceling signal having a large amplitude is inputted to the input device control section, the input device control section may be broken. Further, in the case where the amplitude of the noise canceling signal is smaller than the input voltage level of the voltage which can be inputted to the input device control section, the conversion circuit can convert the amplitude level of the noise canceling signal up to the input voltage level.

In addition to the foregoing arrangement, it is preferable to arrange the display system according to a preferred embodiment of the present invention so that the display section of the display device is a liquid crystal panel which has two substrates and liquid crystal material is provided between the two substrates, and the noise canceling signal has an amplitude and a phase that are equal to an amplitude and a phase of a driving signal which influences the electric charge existing between the liquid crystal panel and the conductive thin plate. According to the foregoing arrangement, it is possible to more effectively reduce the occurrence of the audible noise.

Note that, in addition to the foregoing arrangement, the display system according to a preferred embodiment of the present invention may be arranged such that in the case where the display section of the display device is a liquid crystal panel which has two substrates and liquid crystal material is provided between the two substrates and in the case where a thin film transistor (TFT) is provided on a substrate of the two substrates which is positioned further from the conductive thin plates as in the liquid crystal display device according to the present embodiment, the noise canceling signal has an amplitude and a phase equal with an amplitude and a phase of a driving signal applied to a substrate of the two substrates which is positioned closer to the conductive thin plate.

According to the foregoing arrangement, by equalizing the amplitude and the phase of the noise canceling signal with the amplitude and the phase of the driving signal applied to a substrate of the two substrates constituting the display section particularly causing the audible noise, which substrate is positioned closer to the conductive thin plate, it is possible to more effectively reduce occurrence of the audible noise.

Additional elements, steps, features, characteristics and advantages of the present invention will be apparent from the following detailed description of preferred embodiments thereof with reference to the drawings.

DETAILED DESCRIPTION OF PREFERRED EMBODIMENTS

The following will explain a first preferred embodiment of the present invention with reference to FIG. 1 to FIG. 3 and FIG. 7. Note that, the present invention is not limited to the following explanation of preferred embodiments thereof.

The present preferred embodiment explains, as an example of the display system of the present invention, a touch-panel-integrated liquid crystal display device obtained by providing a liquid crystal display device (display device) with a touch panel input device (input device) having conductive sheets (conductive thin plates) as upper and lower electrodes. The touch-panel-integrated liquid crystal display device is preferably used as a portable information terminal. By bringing a finger, a pen, or the like into contact with a sheet-shaped touch panel provided on the liquid crystal panel surface so as to input information on the basis of contents displayed in the liquid crystal panel, it is possible to control the device. Here, out of such touch-panel-integrated liquid crystal display devices, a device integrated with an input device having a conductive sheet is described as follows.

Figure 1:
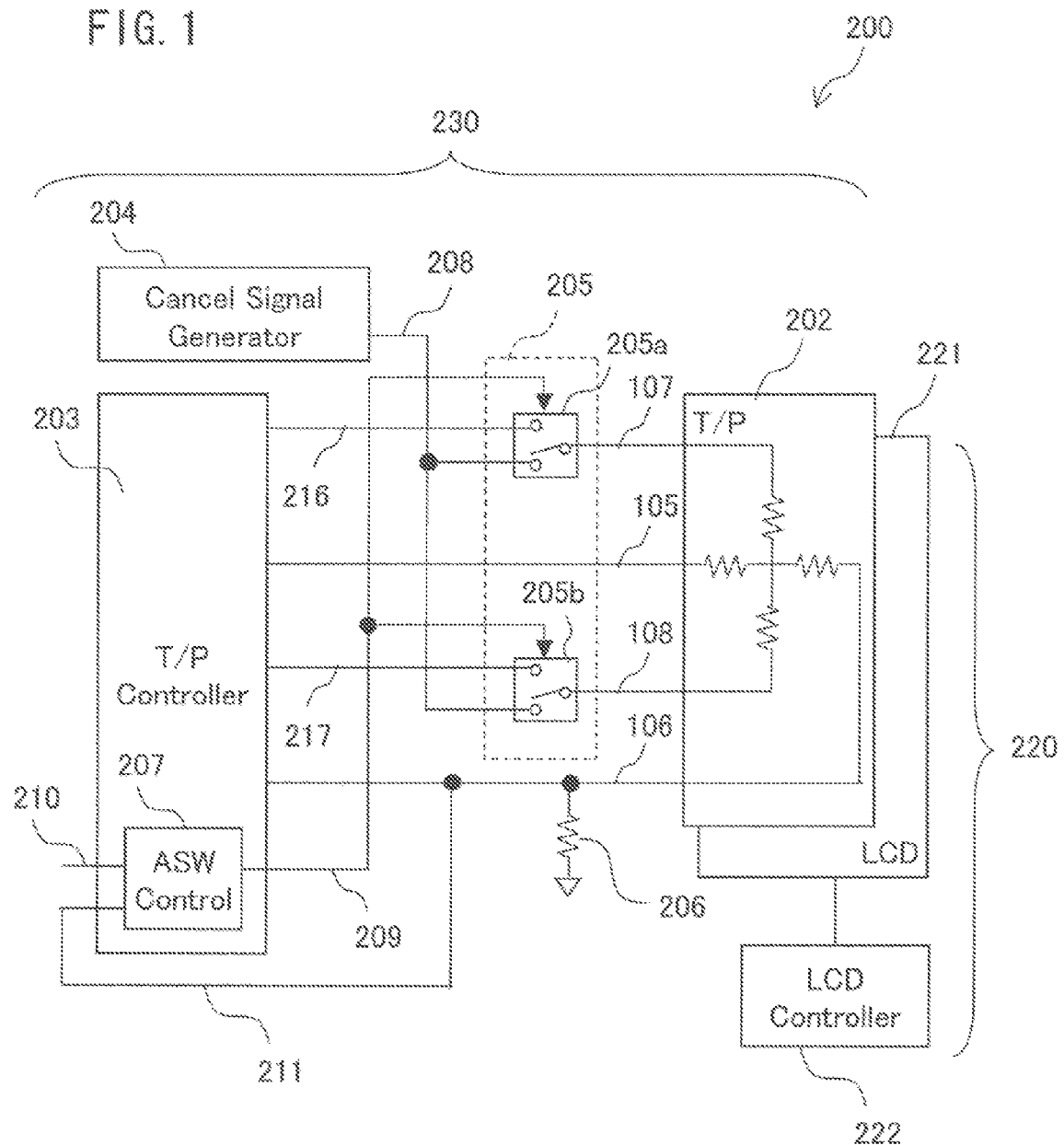
FIG. 1 is a block diagram illustrating a structure of a touch-panel-integrated liquid crystal display device according to a preferred embodiment of the present invention.
Figure 2:
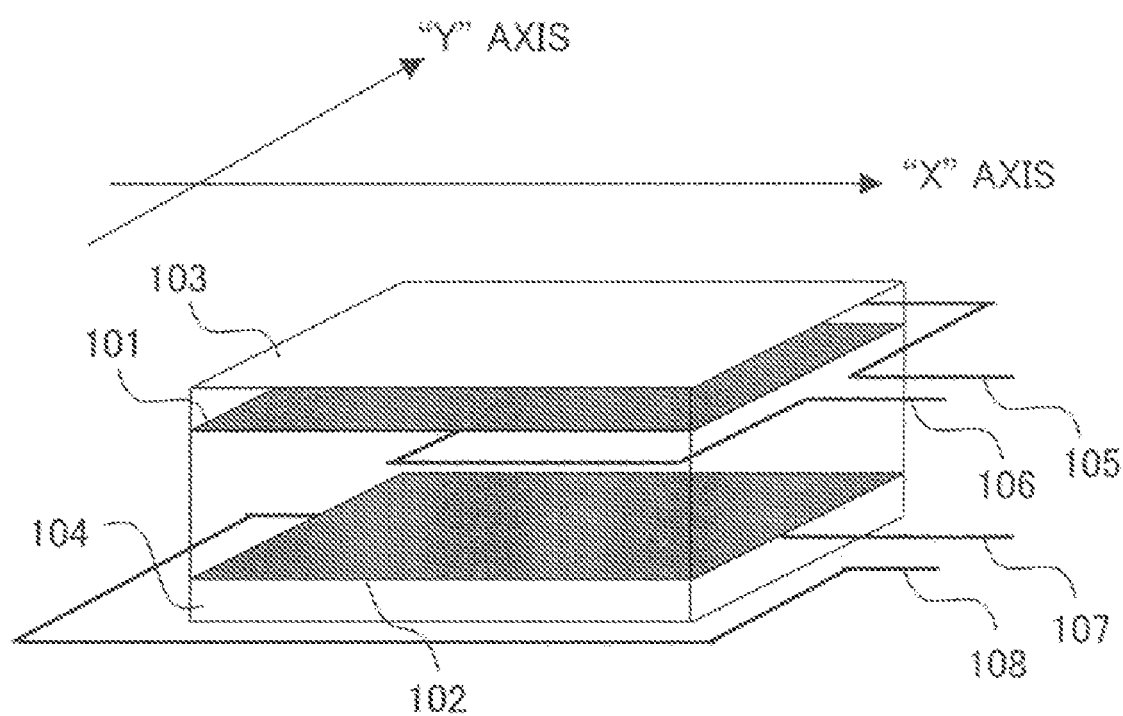
FIG. 2 is a schematic illustrating a structure of a touch panel portion of the touch-panel-integrated liquid crystal display device illustrated in FIG. 1.

FIG. 1 illustrates a structure of a touch-panel-integrated liquid crystal display device (display system) 200 according to the present preferred embodiment. FIG. 2 is a schematic illustrating a structure of a touch panel 202 of the touch-panel-integrated liquid crystal display device 200 according to the present preferred embodiment.

As illustrated in FIG. 1, the touch-panel-integrated liquid crystal display device 200 (hereinafter, referred to also as "display system 200") of the present preferred embodiment preferably includes a liquid crystal display device (display device) 220, and a touch panel input device (input device) 230, provided on the liquid crystal display device 220 which has two conductive thin plates (an upper electrode 101 and a lower electrode 102) each of which detects a position via which information is inputted from the outside.

The liquid crystal display device 220 preferably includes a liquid crystal panel (LCD: display section) 221; and a liquid crystal display device driving section (display device driving section) 222 for controlling display carried out in the liquid crystal panel 221.

Figure 7:
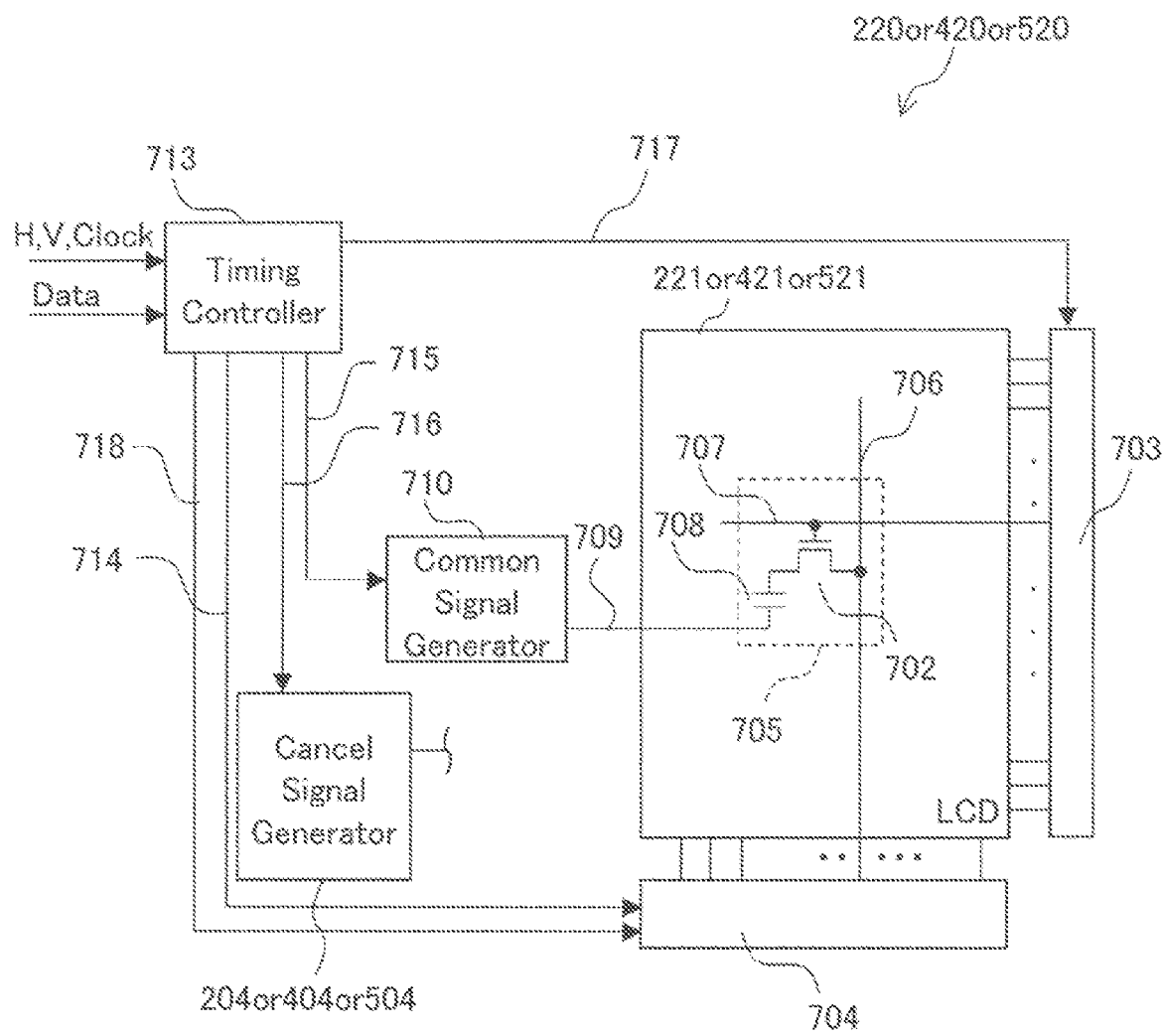
FIG. 7 is a block diagram more specifically illustrating a structure of a liquid crystal display device provided on each of the touch-panel-integrated liquid crystal display devices according to various preferred embodiments of the present invention.

FIG. 7 more specifically illustrates the preferred structure of the liquid crystal display device 220. The liquid crystal display device 220 includes the liquid crystal panel 221 and the liquid crystal display device driving section 222 as main components as described above.

A conventionally known liquid crystal panel is preferably used as the liquid crystal panel 221. For example, the liquid crystal panel includes a glass substrate (substrate) having a TFT (Thin Film Transistor) 702 and a glass substrate (substrate) having a color filter (CF) so that liquid crystal is sealed between the two glass substrates. Further, a plurality of pixels 705 is disposed on the liquid crystal panel 221 in a grating manner. Each of the pixels 705 has at least one TFT 702, and the TFT 702 controls a potential with which a liquid crystal layer 708 of a single pixel is charged. Each TFT 702 preferably includes a gate electrode 707 connected to a gate driver 703, a source electrode 706 connected to a source driver 704, and a common electrode 709 for supplying the liquid crystal layer 708 with a writing reference potential of a data signal outputted from the source driver. In the liquid crystal display device 220 according to the present preferred embodiment, the common electrode 709 is preferably made of transparent metal so as to be formed on the glass substrate having the color filter (CF).

More specifically, the liquid crystal display driving section 222 (not shown in FIG. 7) includes the gate driver 703, the source driver 704, a common signal generation circuit 710, a timing controller 713, and the like.

The gate driver 703 provides a signal to the gate electrode 707 constituting the TFT 702 and controls the ON/OFF of the TFT 702. The source driver 704 provides a data signal the source electrode 706 of the TFT 702. The common signal generation circuit 710 is connected to the common electrode 709 and generates a common electrode driving signal (driving signal) for providing a reference potential to the liquid crystal layer 708 via the common electrode 709. As to the common electrode driving signal applied to the liquid crystal layer 708 of the liquid crystal panel 221 via the common electrode 709, in a case where a polarity of the common electrode driving signal is inversed at each horizontal period and each vertical period (see FIG. 3, (b)-1) and a touch panel exists on the glass substrate having the CF, this is a main cause of noise in the touch panel. Here, "each vertical period" means a period equal to a cycle of a vertical synchronization signal (V) described later.

Note that, a noise canceling signal generator (signal application section) 204 (detailed in the explanation of the touch panel input device 230) provided so as to apply a noise canceling signal to the touch panel 202 is connected to the timing controller 713 as illustrated in FIG. 7. As a result, it is possible to generate a signal having an amplitude and a phase that are equal to an amplitude and a phase of the common electrode driving signal outputted from the common electrode 709.

By receiving the vertical synchronization signal (V), a horizontal synchronization signal (H), and a clock signal (Clock), the timing controller 713 generates driving signals for carrying out display in the liquid crystal panel 221, that is, the timing controller 713 generates signals for controlling the gate driver 703, the source driver 704, the common signal generation circuit 710, and the noise canceling signal generator 204. The timing controller 713 also receives image data (Data). The image data is inputted from the timing controller 713 to the source driver 704 via the data signal line 718.

Further, a source driver control signal line 714 is a signal line via which a source driver control signal outputted from the timing controller 713 is inputted to the source driver 704. A common signal generation circuit control signal line 715 is a signal line via which a common signal generation circuit control signal outputted from the timing controller 713 is inputted to the common signal generation circuit 710. A noise canceling signal generator control signal line 716 is a signal line via which a noise canceling signal generator control signal outputted from the timing controller 713 is inputted to the noise canceling signal generator 204. A gate driver control signal line 717 is a signal line via which a gate driver control signal outputted from the timing controller 713 is inputted to the gate driver 703.

Next, with reference to FIG. 1, the structure of the touch panel input device 230 of the display system 200 will be described in further detail. The touch panel input device 230 preferably includes internal devices such as a touch panel 202 provided on the liquid crystal panel 221, a touch panel controller 203 for controlling the touch panel 202, the noise canceling signal generator (signal application section) 204, and an analog switch (signal switching section) 205.

The touch panel 202 provided on a surface of the liquid crystal panel 221 of the liquid crystal display device 220 (more specifically, the touch panel 202 is provided on the glass substrate having the CF in the liquid crystal panel 221). As illustrated in FIG. 2, the upper electrode 101 made of the conductive thin plate is arranged facing upward so as to detect a position in a Y axis direction of the touch panel 202 and the lower electrode 102 made of the conductive thin plate is arranged facing downward so as to detect an X axis direction of the touch panel 202. That is, the lower electrode 102 is disposed below the upper electrode 101, and the liquid crystal panel 221 of the liquid crystal display device 220 is disposed below the lower electrode 102. Further, upper signal lines 105 and 106 arranged so as to detect the position in the Y axis direction are connected to the upper electrode 101. Also, lower signal lines 107 and 108 arranged so as to detect the position in the X axis direction are connected to the lower electrode 102.

Above the upper electrode 101, an upper layer 103 is provided as a film for fixing the upper electrode. Below the lower electrode 102, a lower layer 104 preferably made of plastic or glass is provided so as to fix the lower electrode.

Next, with reference to FIG. 1, a structure of the internal devices of the touch panel input device 230 will be described as follows. The touch panel input device 230 includes, as the internal devices connected to the touch panel 202, a touch panel controller (input device control section) 203, the noise canceling signal generator (signal application section) 204, the analog switch (signal switching section) 205 (205*a*/ 205*b*), a pull-down resistor 206, an analog switch control circuit 207, a noise canceling signal line 208, an analog switch control signal line 209, a touch panel input stoppage detection signal line 210, a touch panel pen input detection signal line 211, a touch panel controller signal line 216, a touch panel controller signal line 217, the upper signal line 105, the upper signal line 106, the lower signal line 107, and the lower signal line 108.

The touch panel controller 203 is a circuit for detecting a position via which information is inputted to the touch panel. Note that, the touch panel controller 203 includes a touch panel input signal detection circuit for receiving a detection signal for detecting a position via which information is inputted to the touch panel 202 (the detection signal is referred to also as "touch panel input signal") and for detecting the position via which information is inputted.

The noise canceling signal generator 204 is a signal generator for generating a signal (noise canceling signal) that has an amplitude and a phase are equal to an amplitude and a phase of the liquid crystal driving signal (driving signal) outputted from the liquid crystal display device driving section 222 to the LCD 221.

Each of the analog switches 205*a* and 205*b* is a switch for suitably selecting either the touch panel controller 203 or the noise canceling signal generator 204 so as to connect the selected one to the touch panel 202.

In accordance with whether or not information is inputted to the touch panel 202 with a pen, each of the analog switches 205*a* and 205*b* switches the detection signal to the noise canceling signal or switches the noise canceling signal to the detection signal. Specifically, in using the touch panel (in a case where information is inputted to the touch panel 202 with a pen), the lower signal lines 107 and 108 of the touch panel 202 are respectively connected to the signal lines 216 and 217 of the touch panel controller 203. While in the case where the touch panel is not used (in the case where information is not inputted to the touch panel 202 with a pen), the lower signal lines 107 and 108 of the touch panel 202 are connected to the noise canceling signal line 208 of the noise canceling signal generator 204 so that the noise canceling signal is inputted to the touch panel 202.

A pull-down resistor 206 is connected to the upper signal line 106 so as to pull down the touch panel pen input detection signal line 211. Note that, in the case of using the pull-down resistor 206 as a pull-up resistor, an inverter circuit may be inserted into the touch panel pen input signal line 211.

The analog switch control circuit 207 is a circuit for generating a control signal of the analog switches 205*a* and 205*b* in accordance with (i) a signal applied to the touch panel input signal line 211 via the upper signal line 106 of the touch panel 202 in inputting information with a pen and (ii) an input stoppage detection signal for detecting a state in which information is not inputted with a pen (input stoppage detection signal applied to the touch panel input stoppage detection signal line 210).

The analog switch control circuit 207 can be realized by using a latch circuit, for example. A set terminal of the analog switch control circuit 207 is connected to the touch panel input stoppage detection signal line 210 serving as a control signal line when information is not inputted with a pen. A reset terminal of the analog switch control circuit 207 is connected to the touch panel pen input signal line 211 serving as a control signal line when information is inputted with a pen. An output terminal of the analog switch control circuit 207 is connected to the analog switch control signal line 209.

The noise canceling signal line 208 is a signal line to which the noise canceling signal is applied as described above, and the noise canceling signal line 208 is connected to the lower signal lines 107 and 108 of the touch panel 202 via the analog switches 205*a* and 205*b*.

In accordance with whether the touch panel is used or not (that is, in accordance with whether or not any information is inputted from the outside to the touch panel), the analog switch control signal line 209 sends to the analog switch 205 a control signal for selecting a connecting end to which the lower signal lines 107 and 108 of the touch panel should be connected.

The touch panel stoppage detection signal line 210 receives (i) a signal whereby the touch panel controller 203 detects a state in which the touch panel 202 stops operating (that is, a state in which no information is inputted from the outside to the touch panel) or (ii) a control signal for stopping operation of the touch panel controller 203. The touch panel input stoppage detection signal line 210 is connected to the analog switch control circuit 207 of the touch panel controller 203.

The touch panel pen input detection signal line 211 is connected to the upper signal line 106 of the touch panel 202. In a case where information is inputted from the output to the touch panel 202, the upper electrode 101 of the touch panel 202 is electrically connected to the lower electrode 102, so that a signal flowing through the lower signal lines 107 and 108 is applied to the upper signal line 106. The signal applied to the upper signal line 106 is applied to the touch panel pen input signal line 211 and is inputted to the analog switch control circuit 207.

Each of the lower signal lines 107 and 108 disposed on the touch panel 202 is a signal line connected to the lower electrode 102 of the touch panel 202 so as to be positioned closer to the surface of the liquid crystal panel 221. In the case where the touch panel 202 is not used (that is, in the case where no information is inputted from the outside to the touch panel 202), the noise canceling signal outputted from the noise canceling signal generator 204 is applied to the lower signal lines 107 and 108.

Each of the upper signal lines 105 and 106 disposed on the touch panel 202 is a signal line connected to the upper electrode 101 disposed above the lower electrode 102. Upon beginning to input information to the touch panel 202 just after the state in which the touch panel 202 is not used, the upper electrode 101 and the lower electrode 102 of the touch panel 202 come into electric contact with each other, so that the noise canceling signal is outputted to the upper signal lines 105 and 106. Note that, the upper signal line 106 is pulled down onto GND by the pull-down resistor 206.

Each of the touch panel controller signal line 216 and the touch panel controller signal line 217 is a signal line connected to the touch panel controller 203. In the case where the touch panel is used (that is, in the case where information is inputted from the outside to the touch panel 202), the touch panel controller signal line 216 and the touch panel controller signal line 217 are respectively connected to the lower signal lines 108, 107 and the lower electrode 102 by the analog switches 205a and 205b.

In this manner, as to the two upper signal lines 105 and 106 connected to the upper electrode 101 of the touch panel 202 and the two lower signal lines 107 and 108 connected to the lower electrode 102 of the touch panel 202, in using the touch panel, these four signal lines are connected to the touch panel controller 203. As a result, it is possible to detect a position via which information is inputted to the touch panel 202 with a pen.

Note that, FIG. 1 does not illustrate the upper electrode 101 and the lower electrode 102, but they are respectively connected to the upper signal lines 105 and 106 or the lower signal lines 107 and 108 and exist in the touch panel 202.

Figure 3:
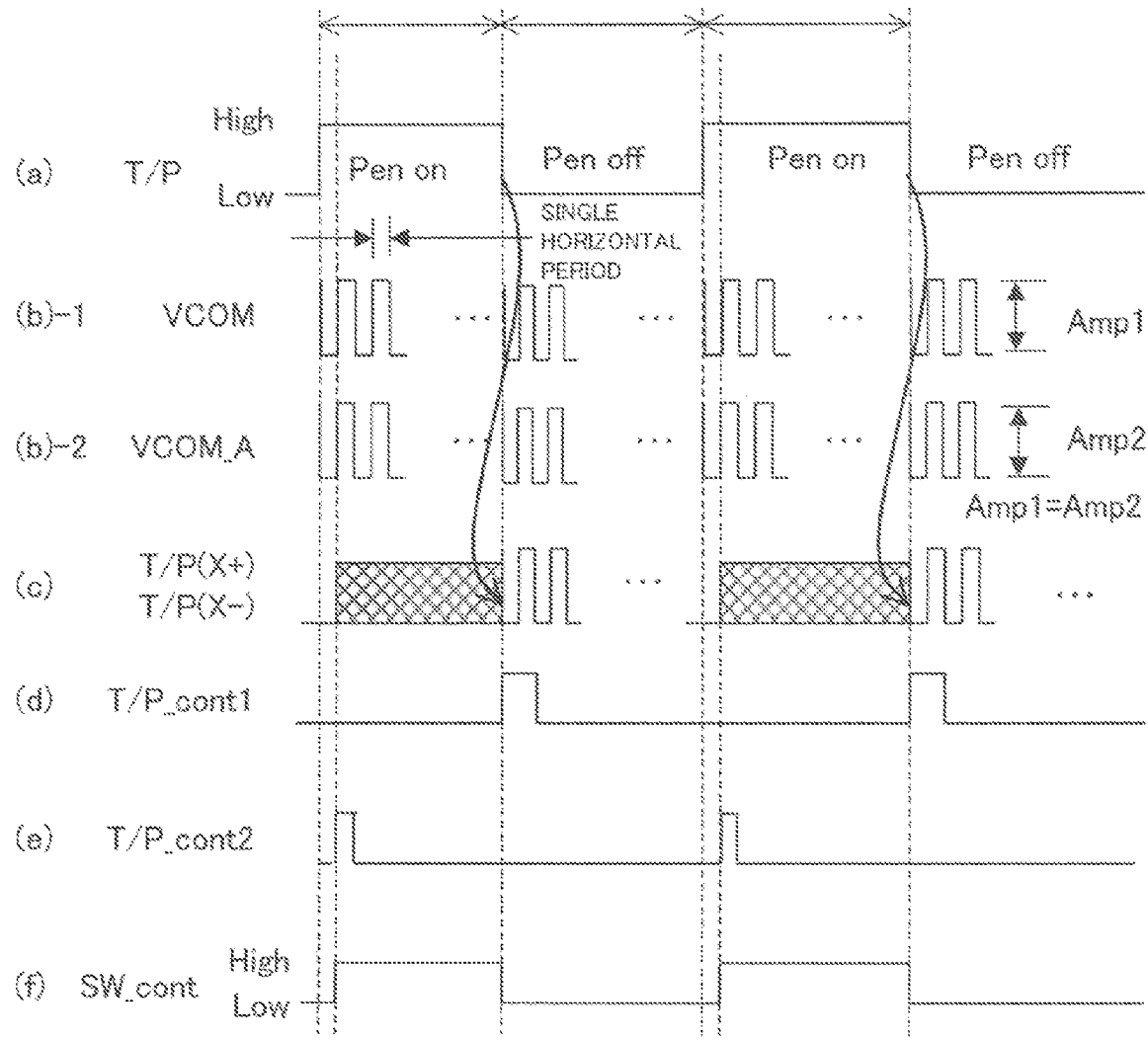
FIG. 3 is a timing chart indicative of timings at which various kinds of signals are outputted from the touch-panel-integrated liquid crystal display device illustrated in FIG. 1.

Next, with reference to the timing chart of FIG. 3, the manner in which the display system 200 operates is described as follows. FIG. 3 is the timing chart illustrating pulse waveforms of various kinds of signals transmitted or received in the display system 200. The various kinds of signals transmitted or received in the display system 200 are described as follows.

In FIG. 3, T/P of (a) represents a pulse waveform of a signal indicative of whether or not information is inputted to the touch panel 202 with a pen. Here, a state in which information is inputted to the touch panel 202 with a pen (in FIG. 3, this state is expressed as "Pen on") is illustrated as "High", and a state in which information is not inputted to the touch panel 202 with a pen (in FIG. 3, this state is expressed as "Pen off") is illustrated as "Low". Note that, the signal T/P merely indicates whether or not information is inputted to the touch panel 202 with a pen, and the signal T/P is irrelevant to the driving signal used to carry out display.

In FIG. 3, VCOM of (b)-1 represents a waveform of a common electrode driving signal which is outputted from the common signal generation circuit 710 of FIG. 7 and is applied to the common electrode 709. As illustrated in FIG. 3, the common electrode driving signal is a signal whose polarity is inversed at each horizontal period and each vertical period.

In FIG. 3, VCOM_A of (b)-2 represents a waveform of the noise canceling signal outputted from the noise canceling signal generator 204. In the present preferred embodiment, the waveform of the VCOM_A has a phase and an amplitude which are equal to a phase and an amplitude of the waveform of the common electrode driving signal VCOM. However, the present invention is not limited to the common electrode driving signal, but it is possible to equalize a phase and an amplitude of other liquid crystal driving signals having a phase and an amplitude of the VCOM_A. The foregoing other liquid crystal driving signal is preferably a liquid crystal driving signal which influences electric charge existing between the touch panel and the liquid crystal panel, for example. Further, as in the present preferred embodiment, in a case where a TFT is disposed on a glass substrate of two glass substrates constituting the liquid crystal panel 512 which glass substrate is positioned further from the touch panel 502, it is possible to use a liquid crystal driving signal outputted from the liquid crystal display driving section 222 and applied to a glass substrate of two glass substrates constituting the liquid crystal panel 221, which glass substrate is positioned closer to the touch panel 202 (in the present preferred embodiment, the glass substrate has a CF).

In FIG. 3, T/P(X+) and T/P(X−) of © represents a pulse waveform of a signal applied to the lower electrode 102 of the touch panel 202. In the case where information is inputted to the touch panel, the touch panel controller signal line 216 and the touch panel controller signal line 217 are respectively connected to the lower signal line 107 and the lower signal line 108, and the touch panel detects a position via which information is inputted to the touch panel 202 with a pen. Therefore, a signal having an amplitude that corresponds to the position via which information is inputted with a pen is outputted.

While, in the case where no information is inputted to the touch panel, the noise canceling signal VCOM_A is inputted to the lower electrode 102, so that a signal having a pulse waveform that is the same as the pulse waveform of the VCOM_A is inputted to the lower electrode 102. As a result, audible noise in the touch panel 202 is reduced.

In FIG. 3, T/P_cont1 of (d) represents a pulse waveform of a signal applied to the touch panel input stoppage detection signal line 210. The T/P_cont1 is a signal which is outputted from the touch panel controller 203 and the like when the touch panel controller 203 detects that the state in which information is inputted to the touch panel 202 with a pen ("Pen on" state) changes to the state in which information is not inputted to the touch panel 202 with a pen ("Pen off" state).

In FIG. 3, T/P_cont2 of (e) represents a pulse waveform of a signal applied to the touch panel pen input detection signal line 211. The T/P_cont2 signal causes generation of a pulse in a case where the VCOM_A signal inputted to the lower electrode 102 of the touch panel 202 by inputting information to the touch panel 202 with a pen is outputted from a signal line connected to the upper electrode 101 of the touch panel 202.

That is, the T/P_cont2 signal is a signal applied right after the state in which information is not inputted to the touch panel 202 with a pen changes to the state in which information is inputted to the touch panel 202 with a pen. More specifically, the upper electrode 101 and the lower electrode 102 are electrically connected to each other in the touch panel 202, so that the VCOM_A signal applied to the lower electrode 102 is applied also to the upper electrode 101 so as to be applied to the touch panel pen input detection signal line 211. Note that, after the state changes to the state in which information is inputted to the touch panel 202 with a pen, the analog switches 205a and 205b cause the touch panel controller signal lines 216 and 217 to be respectively connected to the lower signal lines 107 and 108, so that the pulse waveform of the T/P_cont2 has a shape obtained by applying the VCOM_A in a short period.

In FIG. 3, SW_cont of (f) represents a waveform of a signal outputted from the analog switch control circuit 207 and applied to the analog switch control signal line 209. The SW_cont is a signal generated in the analog switch control circuit 207 to control the analog switches 205a and 205b on the basis of two control signals (T/P_cont1 and the T/P_cont2). For example, the SW_cont generates a signal of "High" in the state in which information is not inputted to the touch panel 202 and generates a signal of "Low" in the state in which information is inputted to the touch panel 202.

The manner in which the noise canceling signal is generated in the display system 200 is briefly described as follows.

The noise canceling signal generator 204 generates a signal having an amplitude and a phase that are equal to an amplitude and a phase of the liquid crystal driving signal for driving the liquid crystal display device 220 as described above. Specifically, the noise canceling signal generator 204 generates a signal (noise canceling signal) having an amplitude and phase are equal with an amplitude and a phase of a signal applied to a glass substrate positioned closer to the touch panel of the liquid crystal display device 220 (that is, the common electrode driving signal). As a result, a force exerted from the signal to the electric charge existing between the liquid crystal panel 221 and the touch panel 202 does not vary with the passage of time, so that it is possible to prevent the touch-panel-integrated liquid crystal display device 200 from vibrating.

The following explains how application of the noise canceling signal reduces audible noise and vibration of the device.

In a case where the noise canceling signal is not inputted to the touch panel, an electric field ($E=(\Delta Vlcd(t)+Vtp)/\Delta z$: "z" represents a distance in the thickness direction) generated from a liquid crystal driving signal Vlcd(t) and a touch panel control signal Vtp (which hardly depends on time) varies with the passage of time. Thus, a force of an electric field represented by $f=qE(t)$ is exerted to the electric charge, and the exertion causes the touch panel or the liquid crystal panel (LCD) to vibrate, and the vibration causes air to vibrate. If a frequency which results from variation of "f" value is in an audible range, the frequency is recognized as audible noise.

While, when the audible cancel signal is applied to the touch panel as in various preferred embodiments of the present invention, a signal Vtp whose amplitude and phase are equal with an amplitude and a phase of the liquid crystal driving signal is inputted to the touch panel, so that an electric field ($E=(\Delta Vlcd(t)+Vtp(t))/\Delta z$) exerted from the touch panel and the LCD to the electric charge is constant. Thus, $f=qE$ is constant, so that no vibration occurs.

Note that, the noise canceling signal line 208 to which the noise canceling signal generated by the noise canceling signal generator 204 is applied is connected via the analog switches 205a and 205b to the lower signal lines 107 and 108 on the side of the lower electrode 102 of the touch panel 202. On this account, the noise canceling signal is applied to the lower electrode 102 (that is, to the electrode closer to the liquid crystal panel 221).

Further, in accordance with whether or not information is inputted to the touch panel 202 with a pen, each of the analog switches 205a and 205b selects either the touch panel controller signal line 216 or the touch panel controller signal line 217 so that the selected one is connected to the lower signal lines 107 and 108. In the display system 200 of the present preferred embodiment, when information is inputted to the touch panel 202 with a pen, the lower signal lines 107 and 108 of the touch panel 202 are respectively connected to signal lines 216 and 217 of the touch panel controller 203. When information is not inputted to the touch panel 202 with a pen, the lower signal lines 107 and 108 of the touch panel 202 are connected to the noise canceling signal line 208 of the noise canceling signal generator 204 so as to allow the noise canceling signal to be inputted to the touch panel 202.

As a result, it is possible to reduce the audible noise while keeping the touch panel function. Note that, in this case, the touch panel cannot be used while inputting the noise canceling signal having a phase and an amplitude that are equal to a phase and an amplitude of the liquid crystal driving signal so that the audible noise is reduced. However, it is generally true that a period in which the touch panel is used is much shorter than a period in which the touch panel is not used. Thus, it is preferable that a switch is provided so as to connect the touch panel controller to the touch panel in using the touch panel and so as to input the liquid crystal driving signal to the touch panel in a case of not using the touch panel, thereby reducing the audible noise while keeping the touch panel function.

Further, when information comes to be inputted to the touch panel 202 which has not received any information (when the state of the touch panel 202 changes to the input state), the upper electrode 101 and the lower electrode 102 of the touch panel 202 are electrically connected to each other, so that the noise canceling signal having been applied to the lower electrode 102 just before changing into the input state is outputted also to the upper electrode 101. As illustrated in (e) of FIG. 3, the noise canceling signal outputted to the upper electrode 101 is applied to the touch panel pen input detection signal line 211 via the upper signal line 106. Further, the noise canceling signal applied to the touch panel pen input signal line 211 is inputted to the analog switch control circuit 207.

Note that, it is the analog switch control circuit 207 that sends a control signal, indicative of whether the noise canceling signal line 208 or the touch panel controller signal lines 216 and 217 should be selected, to the analog switches 205a and 205b. The control signal is generated by the analog switch control circuit 207 and is sent via the analog switch control circuit 209 to the analog switches 205a and 205b.

The following description will explain another preferred embodiment of the present invention, but the present invention is not limited to the following description. The second preferred embodiment describes a touch-panel-integrated liquid crystal display device 400 in a case where a signal amplitude of the noise canceling signal generated by the noise canceling signal generator described above with reference to the first preferred embodiment is larger than an input voltage level of the analog switch control circuit or the touch panel controller, that is, in the case where the input voltage of the noise canceling signal is larger than an input voltage of an input signal of the analog switch control circuit or the touch panel controller.

Figure 4:
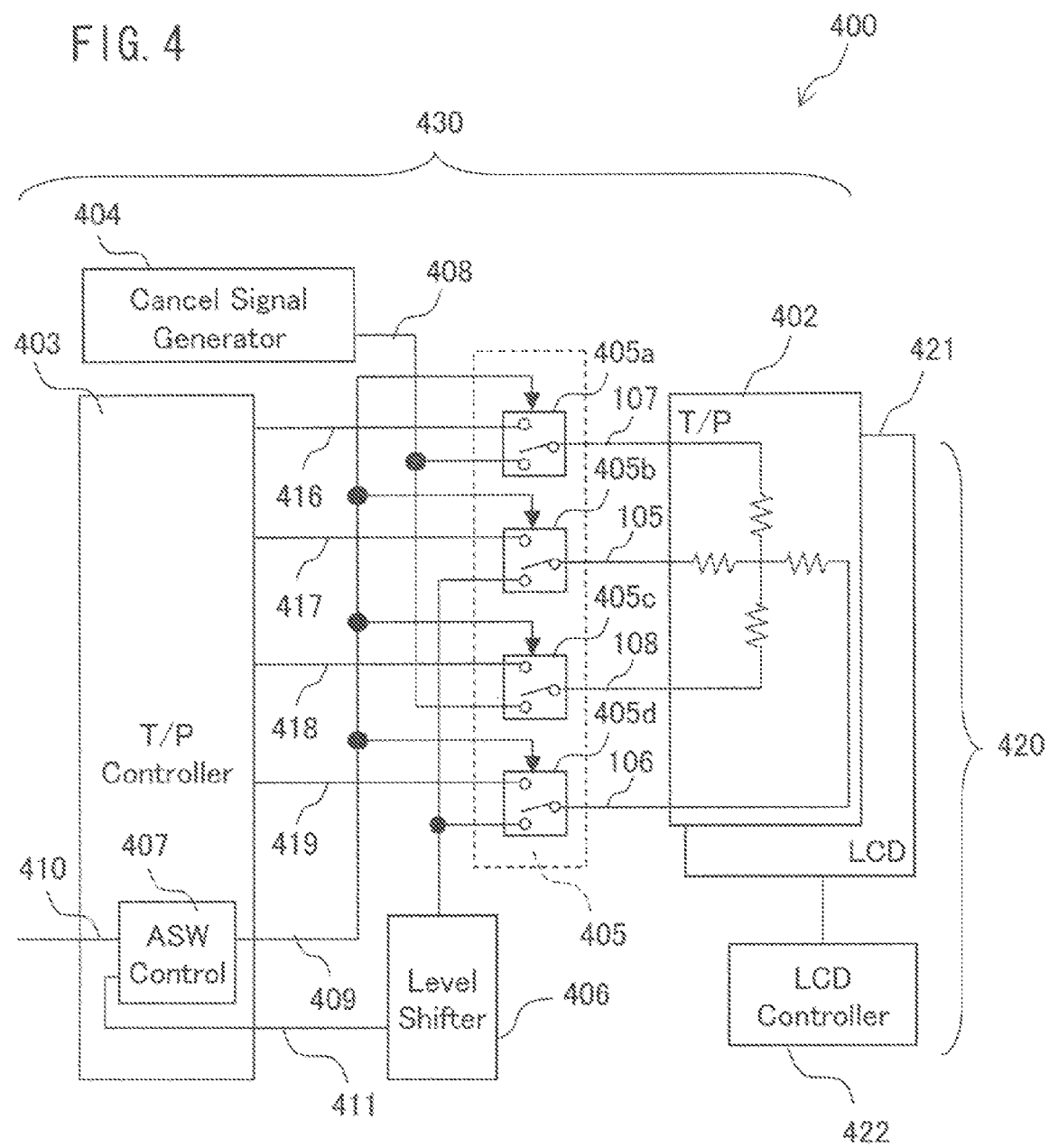
FIG. 4 is a block diagram illustrating a structure of a touch-panel-integrated liquid crystal display device according to a preferred embodiment of the present invention.

FIG. 4 illustrates a structure of the touch-panel-integrated liquid crystal display device (display system) 400 according to the present preferred embodiment. As in the display system 200 described in the first preferred embodiment, the touch-panel-integrated liquid crystal display device 400 (hereinafter, referred to also as "display system 400") is arranged so that a touch panel input device (input device) 430 including two sheet-shaped electrodes (conductive thin plates, an upper electrode 101 and a lower electrode 102, is provided on a liquid crystal display device (display device) 420.

FIG. 7 more specifically illustrates the structure of the liquid crystal display device 420 according to the present preferred embodiment. Note that, the structure is preferably substantially the same as the structure of the liquid crystal display device 220 according to first preferred embodiment, so that description thereof is omitted.

A structure of a touch panel 402 of the display system 400 is preferably substantially the same as the structure described in the first preferred embodiment illustrated in FIG. 2, so that the same reference numerals are used in describing the structure.

As illustrated in FIG. 4, the display system 400 of the present preferred embodiment preferably includes the liquid crystal display device (display device) 420, and a touch panel input device (input device) 430, provided on the liquid crystal display device, which has two conductive thin plates (the upper electrode 101 and the lower electrode 102) for detecting a position via which information is inputted from the outside.

The liquid crystal display device 420 preferably includes a liquid crystal panel (LCD: display section) 421 and a liquid crystal display device driving section (display device driving section) 422 for controlling display carried out in the liquid crystal panel 421.

Further, the touch panel input device 430 of the display system 400 preferably includes internal devices such as a touch panel 402 provided on the liquid crystal panel 421, a touch panel controller 403 for controlling the touch panel 402, a noise canceling signal generator (signal application section) 404, an analog switch (signal switching section) 405 (405a to 405d), a signal voltage conversion circuit (conversion circuit) 406, and the like.

The touch panel 402 is provided on a surface of the liquid crystal panel 421 of the liquid crystal display device 420. As illustrated in FIG. 4, the upper electrode 101 constituted of a conductive thin plate arranged so as to detect a position in a Y axis direction of the touch panel 402 and the lower electrode 102 constituted of a conductive thin plate so as to detect a position in an X axis direction of the touch panel 402 are arranged so as to overlap each other. That is, the lower electrode 102 is disposed below the upper electrode 101, and the liquid crystal panel 421 of the liquid crystal display device 420 is provided below the lower electrode 102. Further, the upper electrode 101 is connected to the upper signal lines 105 and 106 arranged so as to detect a position in the Y axis direction. The lower electrode 102 is connected to the lower signal lines 107 and 108 arranged so as to detect a position in the X axis direction.

Further, an upper layer 103 is provided on the upper electrode 101 as a film for fixing the upper electrode, and a lower layer 104 made of plastic or glass is provided below the lower electrode 102 so as to fix the lower electrode.

Next, with reference to FIG. 4, the manner in which the internal devices of the touch panel input device 430 are arranged will be described as follows. As the internal devices connected to the touch panel 402, the touch panel input device 430 preferably includes the touch panel controller (input device control section) 403, a noise canceling signal generator (signal application section) 404, an analog switch (signal switching section) 405 (405a to 405d), a signal voltage conversion circuit (conversion circuit) 406, an analog switch control circuit 407, a noise canceling signal line 408, an analog switch control signal line 409, a touch panel input stoppage detection signal line 410, a touch panel pen input detection signal line 411, touch panel controller signal lines 416 to 419, the upper signal lines 105 and 106, and the lower signal lines 107 and 108.

The touch panel controller 403 is a circuit for detecting a position via which information is inputted to the touch panel with a pen.

The noise canceling signal generator 404 generates a signal (noise canceling signal) having an amplitude and a phase that are equal with an amplitude and a phase of a liquid crystal driving signal (driving signal) outputted from the liquid crystal display device driving section 422 to the LCD 421. In the present preferred embodiment, the signal having an amplitude and a phase that are equal with an amplitude and a phase of the liquid crystal driving signal is referred to as "noise canceling signal".

Each of the analog switches 405a and 405b is a switch for suitably select either the touch panel controller 403 or the noise canceling signal generator 404 so as to connect the selected one to the touch panel 402. That is, each of the analog switches 405a and 405b selects either the touch panel controller 403 or the noise canceling signal generator 404 so as to connect the selected one to the lower signal lines 107 and 108 and the lower electrode 102 of the touch panel.

Further, in accordance with whether or not information is inputted to the touch panel 402 with a pen, each of the analog switches 405a and 405b switches the touch panel controller 403 to the noise canceling signal generator 404 or switches the noise canceling signal generator 404 to the touch panel controller 403. Specifically, in a case of using the touch panel (in a case where information is inputted to the touch panel 403 with a pen), the lower signal lines 107 and 108 of the touch panel 402 are respectively connected to the signal lines 416 and 418 of the touch panel controller 403. While, in a case where the touch panel is not used (in a case where information is not inputted to the touch panel 402 with a pen), the lower signal lines 107 and 108 of the touch panel 402 are connected to the noise canceling signal line 408 of the noise canceling signal generator 404 so as to cause the noise canceling signal to be inputted to the touch panel 402.

Each of the analog switches 405a and 405b suitably selects either the touch panel controller 403 or the analog switch control circuit 404 (including the signal voltage conversion circuit 406) so as to connect the selected one to the touch panel 402. On the basis of (i) an output signal (control signal in a case where information is inputted with a pen) sent from the upper signal line 106 of the touch panel 402 to the touch panel pen input signal line 411 in inputting information with a pen and (ii) a detection signal sent to the touch panel pen input stoppage detection signal line 410 in a case where information is not inputted with a pen, the analog switch control circuit 407 generates a control signal of the analog switch 405. The analog switch control circuit 407 can be realized by using a latch circuit, for example. A set terminal of the analog switch control circuit 407 is connected to the touch panel input stoppage detection signal line 410 serving as a control signal line in a case where information is not inputted with a pen. A reset terminal of the analog switch control circuit 407 is connected to the touch panel pen input signal line 411 serving as a control signal in a case where information is inputted with a pen. An output terminal of the analog switch control circuit 407 is connected to the analog switch control signal line 409.

The noise canceling signal line 408 is a signal line to which the noise canceling signal is applied as described above, and the noise canceling signal line 408 is connected via the analog switch 405 to the lower signal lines 107 and 108 of the touch panel 402.

The signal voltage conversion circuit 406 converts an amplitude level of the noise canceling signal down to an input voltage level in a case where the amplitude level of the noise canceling signal is higher than the input voltage level of the touch panel controller 403 or the analog switch control circuit 407. The signal voltage conversion circuit 406 allows the amplitude of the noise canceling signal to vary in a case where the amplitude level of the noise canceling signal inputted to the touch panel is higher than an amplitude level of a signal which can be inputted to the touch panel controller. Thus, it is possible to avoid such a possibility that an amplitude level of the noise canceling signal inputted to the touch panel controller 403 is so high that the touch panel controller 403 is broken.

Note that, in a case where the amplitude level of the noise canceling signal is lower than the input voltage level of the touch panel controller 403 or the analog switch control circuit 407, the signal voltage conversion circuit 406 can convert the amplitude level of the noise canceling signal up to the input voltage level.

In accordance with whether the touch panel is used or not (that is, in accordance with whether or not information is inputted from the outside to the touch panel), the analog switch control signal line 409 sends, to each of the analog switches 405a and 405c, a control signal for controlling selection of a connecting end to which each of the lower signal lines 107 and 108 of the touch panel should be connected.

Likewise, in accordance with whether the touch panel is used or not (that is, in accordance with whether or not information is inputted from the outside to the touch panel), the analog switch control signal line 409 sends, to each of the analog switches 405b and 405d, a control signal for controlling selection of a connecting end to which each of the upper signal lines 105 and 106 of the touch panel should be connected.

The touch panel stoppage detection signal line 410 receives a signal whereby the touch panel controller 403 detects that the touch panel 403 is in a stoppage state (that is, a state in which information is not inputted from the outside to the touch panel) or receives a control signal for stopping operation of the touch panel controller 403. The touch panel input stoppage detection signal line 410 is connected to the analog switch control circuit 407 provided in the touch panel controller 403.

The touch panel pen input detection signal line 411 is connected to the upper signal line 106 of the touch panel 402 via the analog switch 405d and the signal voltage conversion circuit 406. In a case where information is inputted from the outside to the touch panel 402, the upper electrode 101 and the lower electrode 102 of the touch panel 402 come into electric contact with each other, such that a signal applied to each of the lower signal lines 107 and 108 is applied to the upper electrode 106. Further, the signal applied to the upper signal line 106 is inputted to the signal voltage conversion circuit 406 via the analog switch 405d and is subjected to voltage conversion with the signal voltage conversion circuit 406, and then the converted signal is applied to the touch panel pen input signal line 411 and is inputted to the analog switch control circuit 407.

Each of the lower signal lines 107 and 108 disposed on the touch panel 402 is a signal line connected to the lower electrode 102 provided on the touch panel 402 so as to be positioned closer to the surface of the liquid crystal panel 421. In a case where the touch panel 402 is not used (that is, in a case where information is not inputted from the outside to the touch panel 402), the noise canceling signal outputted from the noise canceling signal generator 404 is applied to the lower signal lines 107 and 108.

Each of the upper signal lines 105 and 106 disposed on the touch panel 402 is a signal line connected to the upper electrode 101 disposed above the lower electrode 102. When information comes to be inputted to the unused touch panel 402, the upper electrode 101 and the lower electrode 102 of the touch panel 402 come into electric contact with each other, the noise canceling signal is outputted to the upper signal lines 105 and 106. Further, an amplitude of the outputted noise canceling signal is adjusted by the signal voltage conversion circuit 406 so as to carry out voltage conversion.

Each of the touch panel controller signal lines 416 to 419 is a signal line connected to the touch panel controller 403. In a case where the touch panel is used (that is, in a case where information is inputted from the outside to the touch panel 402), the touch panel signal lines 416 and 418 are connected to the lower signal lines 107 and 108 and the lower electrode 102 by the analog switches 405a and 405c. Further, in a case where the touch panel is used (that is, in a case where information is inputted from the outside to the touch panel 402), the touch panel signal lines 417 and 419 are connected to the upper signal lines 105 and 106 and the upper electrode 101 by the analog switches 405b and 405d.

In this manner, four signal lines (the upper signal lines 105 and 106 connected to the upper electrode 101 of the touch panel 402 and the lower signal lines 107 and 108 connected to the lower electrode 102) are connected to the touch panel controller 403 in a case where the touch panel is used. This allows detection of a position via which information is inputted to the touch panel 402 with a pen.

Note that, FIG. 4 does not illustrate the upper electrode 101 and the lower electrode 102, but the upper electrode 101 and the lower electrode 102 are respectively connected to the upper signal lines 105 and 106 or the lower signal lines 107 and 108 and exist in the touch panel 402.

As described above, the display system 400 according to the present preferred embodiment is preferably arranged substantially in the same manner as in the display system 200 according to the first preferred embodiment except that the signal voltage conversion circuit 406 is provided, the analog switches 405b and 405d are additionally provided, and the pull-down resistor is not provided.

Thus, operation of the display system 400 is substantially the same as the operation of the display system 200 of the first preferred embodiment. That is, a timing chart indicative of pulse waveforms of various kinds of signals received in the display system 400 is the same as the timing chart illustrated in FIG. 3. Thus, description thereof is omitted in the present preferred embodiment.

Further, in the display system 400 according to the present preferred embodiment, the signal voltage conversion circuit 406 is provided as described above, so that it is possible to adjust an amplitude of the noise canceling signal so as to correspond to an input voltage level of the touch panel controller 403 or the analog switch control circuit 407. As a result, it is possible to avoid such a problem that a noise canceling signal having a voltage whose level exceeds the input voltage level is inputted to the touch panel controller 403 or the analog switch control circuit 407, with the result that the touch panel controller 403 or the analog switch control circuit 407 is broken. Further, it is possible to prevent a problem caused by inputting a noise canceling signal having a voltage whose level is less than the input voltage level into the touch panel controller 403 or the analog switch control circuit 407.

Figure 6:
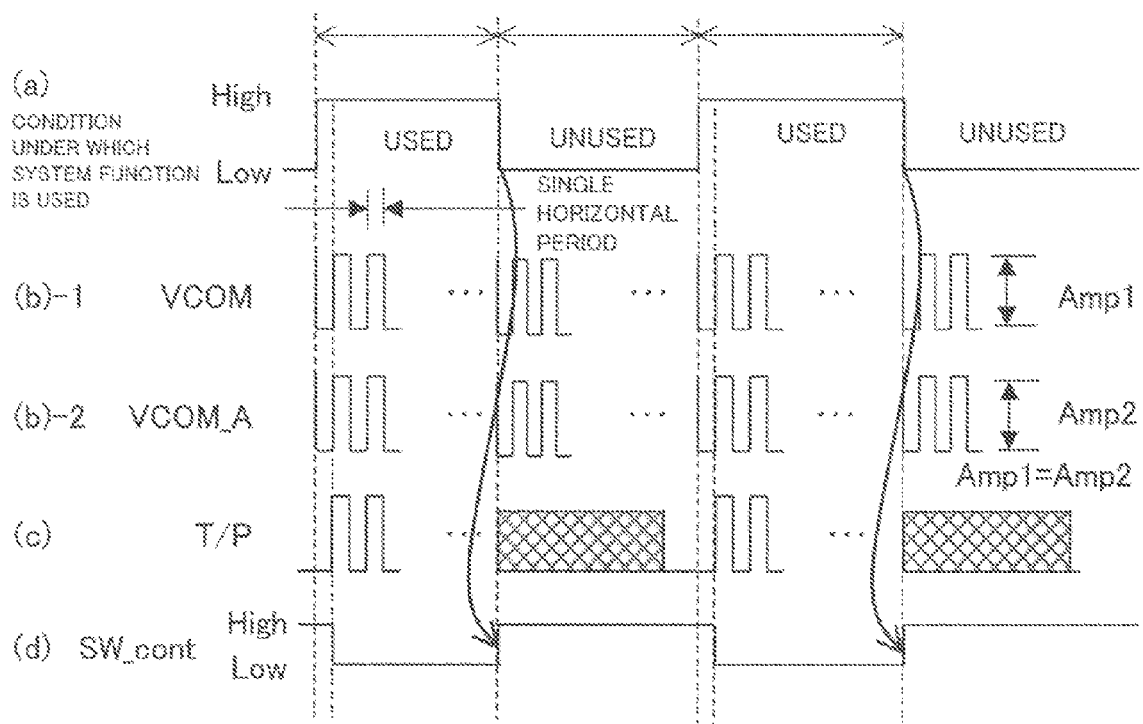
FIG. 6 is a timing chart indicative of timings at which various kinds of signals are outputted from the touch-panel-integrated liquid crystal display device illustrated in FIG. 5.

Next, the following description will explain a further preferred embodiment of the present invention with reference to FIG. 3, FIG. 6, and FIG. 7, but the present invention is not limited to the description. In the above-described preferred embodiments, switching operation of the analog switch is carried out in accordance with whether or not information is inputted to the touch panel with a pen. A touch-panel-integrated liquid crystal display device 500 according to the present preferred embodiment is preferably a display system, having also a telephone function and a sound collecting function, which carries out switching operation of an analog switch in accordance with a condition of these functions (whether each of these functions is used or not).

Figure 5:
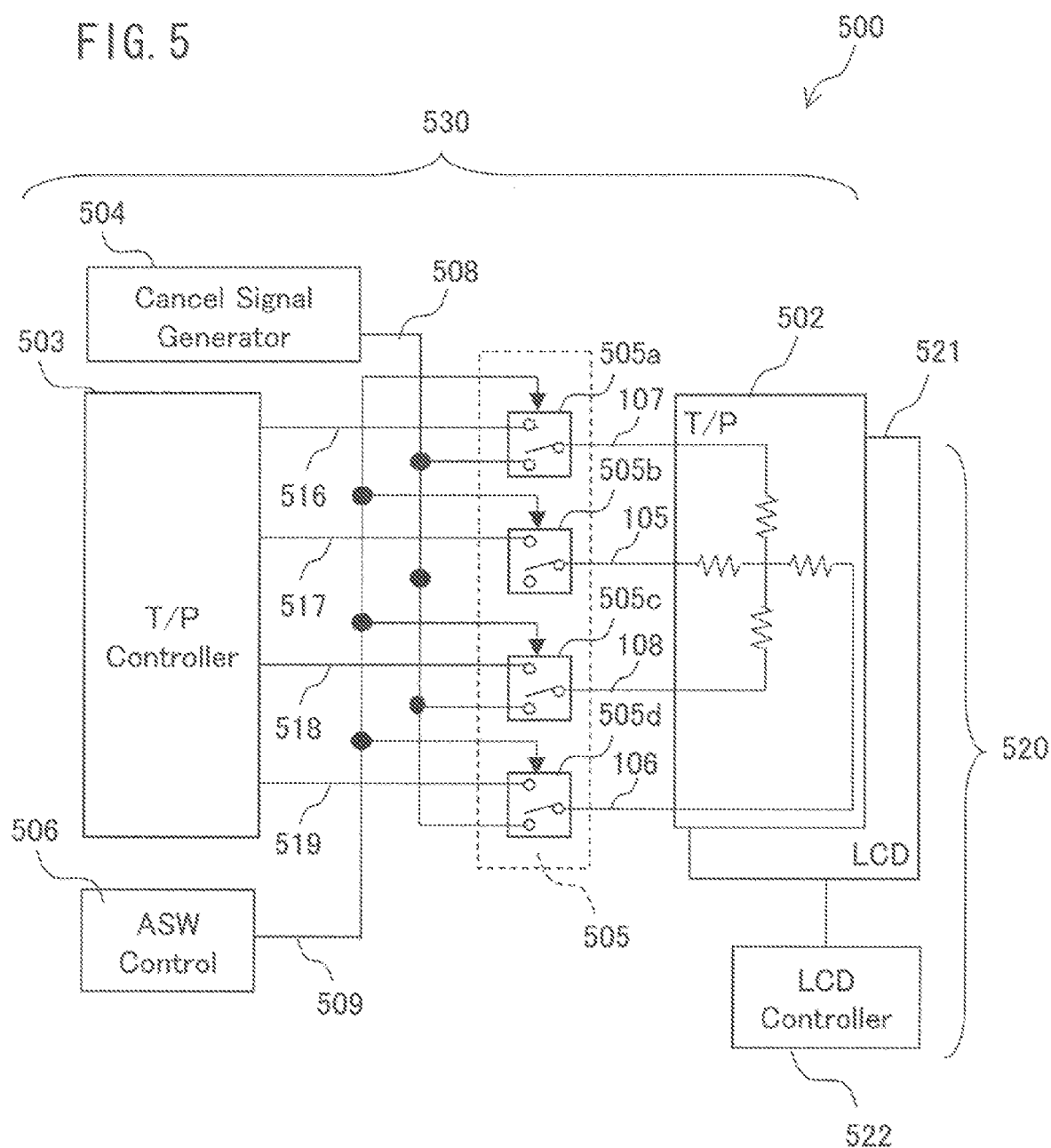
FIG. 5 is a block diagram illustrating a structure of a touch-panel-integrated liquid crystal display device according to a preferred embodiment of the present invention.

FIG. 5 illustrates a structure of the touch-panel-integrated liquid crystal display device (display system) 500 according to the present preferred embodiment. As in the display system 200 described in the first preferred embodiment, the touch-panel-integrated liquid crystal display device 500 (hereinafter, referred to also as "display system 500") is arranged such that a touch panel input device (input device) 530 including two sheet-shaped electrodes (conductive thin plates) referred to as an upper electrode 101 and a lower electrode 102 is provided on a liquid crystal display device 520.

FIG. 7 more specifically illustrates a structure of the liquid crystal display device 520 according to the present preferred embodiment. Note that, the structure is preferably substantially the same as the structure of the liquid crystal display device 220 according to the first preferred, so that description thereof is omitted.

A structure of a touch panel 502 of the display system 500 is preferably substantially the same as the structure described in the first preferred embodiment illustrated in FIG. 2, so that the same reference numerals are used in describing the structure.

As illustrated in FIG. 5, the display system 500 of the present preferred embodiment preferably includes the liquid crystal display device (display device) 520, and a touch panel input device (input device) 530, provided on the liquid crystal display device, which has two conductive thin plates (the upper electrode 101 and the lower electrode 102) for detecting a position via which information is inputted from the outside.

The liquid crystal display device 520 preferably includes a liquid crystal panel (LCD: display section) 521 and a liquid crystal display device driving section (display device driving section) 522 for controlling display carried out in the liquid crystal panel 521.

Further, as internal devices, the touch panel input device 530 of the display system 500 preferably includes the touch panel 502 provided on the liquid crystal panel 521, a touch panel controller 503 for controlling the touch panel 502, a noise canceling signal generator (signal application section) 504, an analog switch (signal switching section) 505 (505*a* to 505*d*), an analog switch control circuit 506; and the like.

The touch panel 502 is provided on a surface of the liquid crystal panel 521 of the liquid crystal display device 520. As illustrated in FIG. 5, the upper electrode 101 constituted of a conductive thin plate so as to detect a position in a Y axis direction of the touch panel 502 and the lower electrode 102 constituted of a conductive thin plate so as to detect a position in an X axis direction of the touch panel 502 are arranged so as to overlap each other. That is, the lower electrode 102 is disposed below the upper electrode 101, and the liquid crystal panel 521 of the liquid crystal display device 520 is provided below the lower electrode 102. Further, the upper electrode 101 is connected to the upper signal lines 105 and 106 arranged so as to detect a position in the Y axis direction. The lower electrode 102 is connected to the lower signal lines 107 and 108 provided so as to detect a position in the X axis direction.

Further, an upper layer 103 is provided on the upper electrode 101 as a film for fixing the upper electrode, and a lower layer 104 made of plastic or glass is provided below the lower electrode 102 so as to fix the lower electrode.

Next, with reference to FIG. 5, the manner in which the internal devices of the touch panel input device 530 are arranged will be described as follows. As the internal devices connected to the touch panel 502, the touch panel input device 530 includes the touch panel controller (input device control section) 503, a noise canceling signal generator (signal application section) 504, an analog switch (signal switching section) 505 (505*a* to 505*d*), an analog switch control circuit 506, a noise canceling signal line 508, an analog switch control signal line 509, touch panel controller signal lines 516 to 519, the upper signal lines 105 and 106, and the lower signal lines 107 and 108.

The touch panel controller 503 is a circuit for detecting a position via which information is inputted to the touch panel with a pen.

The noise canceling signal generator 504 generates a signal (noise canceling signal) having an amplitude and a phase that are equal with an amplitude and a phase of a liquid crystal driving signal (driving signal) outputted from the liquid crystal display device driving section 522 to the LCD 521. In the present preferred embodiment, the signal having an amplitude and a phase that are equal with an amplitude and a phase of the liquid crystal driving signal is referred to as "noise canceling signal".

Each of the analog switches 505*a* and 505*d* is preferably a switch for suitably selecting either the touch panel controller 503 or the noise canceling signal generator 504 so as to connect the selected one to the touch panel 502. Specifically, each of the analog switches 505*a* and 505*c* selects either a detection signal from the touch panel controller 503 or the noise canceling signal from the noise canceling signal generator 504 so as to input the selected one to the lower signal lines 107 and 108 and the lower electrode 102 of the touch panel. Further, each of the analog switches 505*b* and 505*d* selects a detection signal from the touch panel controller 503 or the noise canceling signal from the noise canceling signal generator 504 so as to input the selected one to the upper signal lines 105 and 106 and the upper electrode 101 of the touch panel.

In accordance with whether or not the display system 500 uses the telephone function and/or the sound collecting function, each of the analog switches 505*a* to 505*d* switches the control signal to the noise canceling signal or switches the noise canceling signal to the control signal. Further, in a case where each of the foregoing functions is used, the upper signal lines 105 and 106 and the lower signal lines 107 and 108 of the touch panel 502 are connected to the noise canceling signal line 508 of the noise canceling signal generator 504 so as to allow the noise canceling signal to be inputted to the touch panel 502. In a case where each of the foregoing functions is not used, the upper signal lines 105 and 106 and the lower signal lines 107 and 108 of the touch panel 502 are respectively connected to the signal lines 517, 519, 516, and 518 of the touch panel controller 503.

Further, the analog switch control circuit 506 is a circuit for generating control signals of the analog switches 505*a* to 505*d* in accordance with a condition under which the display system 500 uses the telephone function and/or the sound collecting function.

The noise canceling signal line 508 is a signal line to which the noise canceling signal is applied as described above, and is connected to the lower signal lines 107 and 108 and the upper signal lines 105 and 106 of the touch panel 502 via the analog switch 505 (505*a* to 505*d*). Note that, in the first and second preferred embodiments, the noise canceling signal line is connected merely to the lower signal lines 107 and 108 via the analog switch. In the present preferred embodiment, the noise canceling signal line can be connected also to the upper signal lines 105 and 106.

In the display system 500 according to a preferred embodiment of the present embodiment, the analog switch control circuit 509 is connected to the analog switches 505*a* to 505*d*, so that it is possible to apply the noise canceling signal to the touch panel 502 in accordance with a condition under which the telephone function or the sound collecting function added to the system is used.

The analog switch control signal line 509 is a signal line for sending, to the analog switches 505*a* to 505*d*, control signals, each of which is generated by the analog switch control circuit 506 to select connecting ends to which the upper signal lines 105 and 106 and the lower signal lines 107 and 108 should be connected.

Each of the lower signal lines 107 and 108 disposed on the touch panel 502 is a signal line connected to the lower electrode 102 of the touch panel 402, which lower electrode 102 is located closer to the surface of the liquid crystal panel 521.

Further, each of the upper signal lines 105 and 106 disposed on the touch panel 502 is a signal line connected to the upper electrode 101 disposed above the lower electrode 102 (further from the liquid crystal panel 521).

Each of the touch panel controller signal lines 516 to 519 is a signal line connected to the touch panel controller 503. The touch panel signal lines 516 to 519 are respectively connected to the touch panel signal lines 105 to 108 by the analog switches 505a to 505d in a case where the telephone function or the sound collecting function is not used.

Note that, FIG. 5 does not illustrate the upper electrode 101 and the lower electrode 102, but the upper electrode 101 and the lower electrode 102 are respectively connected to the upper signal lines 105 and 106 or the lower signal lines 107 and 108 and exist in the touch panel 502.

Next, the manner in which the display system 500 operates is described as follows with reference to a timing chart illustrated in FIG. 6. FIG. 6 is a timing chart indicative of pulse waveforms of various kinds of signals received in the display system 500. The various kinds of signals received in the display system 500 are described as follows.

In FIG. 6, (a) illustrates a condition under which the telephone function and/or the sound collecting function are used in the display system 500. In (a) of FIG. 6, a condition under which the foregoing functions are used ("used" in FIG. 6) is indicated by "High" and a condition under which the foregoing functions are not used ("unused" in FIG. 6) is indicated by "Low". Note that, the signal merely indicates the condition under which the foregoing functions are used/unused, and the signal is irrelevant to the driving signal used to carry out display.

In FIG. 6, VCOM of (b)-1 is indicative of a waveform of a common electrode driving signal outputted from a common signal generation circuit 710 of FIG. 7 and applied to the common electrode 709. As illustrated in FIG. 6, the common electrode driving signal is a signal having a polarity that is inverted at each horizontal period and each vertical period.

In FIG. 6, VCOM_A of (b)-2 is indicative of a waveform of the noise canceling signal outputted from the cancel signal generation circuit 504. In the present preferred embodiment, the waveform of VCOM_A has a phase and an amplitude which are equal to a phase and an amplitude indicated by the waveform of the common electrode driving signal VCOM. Thus, in the present invention, the signal is not limited to the common electrode driving signal, but it is possible to equalize the phase and the amplitude of VCOM_A with a phase and an amplitude of other liquid crystal driving signal. For example, it is preferable that the foregoing other liquid crystal driving signal influences electric charge existing between the touch panel and the liquid crystal panel. As in the present preferred embodiment, in a case where a TFT is disposed on a glass substrate of two glass substrates constituting the liquid crystal panel 521 which glass substrate is positioned further from the touch panel 502, it is possible to use a liquid crystal driving signal outputted from the liquid crystal display driving section 522 and applied to a glass substrate of two glass substrates constituting the liquid crystal panel 521 which glass substrate is positioned closer to the touch panel 502 (in the present preferred embodiment, the glass substrate preferably has a CF).

In FIG. 6, SW_cont of (d) is indicative of a pulse waveform of a signal outputted from the analog switch control circuit 506 and applied to the analog switch control signal line 509. For example, SW_cont causes generation of a signal "Low" in a case where the telephone function and/or the sound collecting function are used, and SW_cont causes generation of a signal "High" in a case where the foregoing functions are not used. In FIG. 6, T/P of © is indicative of a waveform of a signal applied to the lower electrode 102 and the upper electrode 101 of the touch panel 502.

As illustrated in FIG. 6, in a case where the telephone function and/or the sound collecting function are used in the display system 500, VCOM_A signal serving as the noise canceling signal is inputted to each of the lower signal lines 107 and 108 and the upper signal lines 105 and 106 (not shown) of the touch panel 502, thereby reducing the audible noise in the touch panel 502. In a case where the telephone function and/or the sound collecting function are not used in the display system 500, the lower signal lines 107 and 108 and the upper signal lines 105 and 106 (not shown) are respectively connected to the touch panel controller signal lines 516 to 519, thereby detecting a position via which information is inputted to the touch panel 502 with a pen.

As described above, in a case where the telephone function or the sound collecting function is used in the display system 500 according to the present preferred embodiment, the noise canceling signal is applied to the touch panel 502. Therefore, it is possible to suppress occurrence of audible noise while talking on the phone, thereby making it easier to hear the sound (voice) of the speaker. Further, it is possible to prevent occurrence of audible noise caused by noise of the touch panel in collecting sound.

Note that, in the above-described preferred embodiments, the touch panel input device was described as an example of the device having conductive thin plates, but the present invention is not limited to this. In the present invention, examples of the device having conductive thin plates include not only the touch panel input device but also an LCD module having an optical sheet or the like provided on a display panel of a liquid crystal display device.

The various preferred embodiments and specific examples of implementation discussed in the foregoing detailed explanation serve solely to illustrate the technical details of the present invention, which should not be narrowly interpreted within the limits of such preferred embodiments and specific examples, but rather may be applied in many variations within the spirit of the present invention, provided such variations do not exceed the scope of the patent claims set forth below.

According to various preferred embodiments of the present invention, in a display system such as a touch-panel-integrated display device arranged so that an input device and a display device are integrated to each other, it is possible to reduce vibration, audible noise, and the like, which are caused by noise of the system. Therefore, in developing such a display system, the present invention can be effectively used to further enhance convenience and easiness to use the display system.

The invention claimed is:

1. A display system, which includes a display device and an input device, the input device being provided on a display section of the display device and having one or more conductive thin plates and being arranged to detect a position via which information is inputted from outside, said display system comprising:

a display device driving section arranged to drive the display device;

a signal application section arranged to apply, to the device having the one or more conductive thin plates, a noise canceling signal having an amplitude and a phase that are equal with an amplitude and a phase of a driving signal applied from the display device driving section to the display device;

an input device control section to which a detection signal is applied, the detection signal being arranged to detect a position via which information is inputted from outside to the conductive thin plate; and a signal switching section arranged to select either the noise canceling signal or the detection signal so as to input the selected signal to the conductive thin plate.

2. The display system according to claim 1, wherein the device having the one or more conductive thin plates includes two conductive thin plates overlapping each other, and the noise canceling signal is applied to at least a conductive thin plate of the two conductive thin plates which is located closer to the display section of the display device.

3. The display system according to claim 1, wherein the input device has two conductive thin films overlapping each other, and the noise canceling signal is applied to at least a conductive thin plate of the two conductive thin plates which is located closer to the display section of the display device.

4. The display system according to claim 1, wherein the signal switching section switches the noise canceling signal to the detection signal or switches the detection signal to the noise canceling signal in accordance with whether or not information is inputted from outside to the conductive thin plate.

5. The display system according to claim 1, wherein in a case where the display system is provided on a device having at least one of a telephone function and a sound collecting function, the signal switching section selects the noise canceling signal in using said at least one of the telephone function and the sound collecting function so as to input the noise canceling signal to the conductive thin plate.

6. The display system according to claim 1, wherein the input device further includes a conversion circuit arranged to convert an amplitude of the noise canceling signal before inputting the noise canceling signal to the input device control section.

7. The display system according to claim 1, wherein the display section of the display device is a liquid crystal panel which has two substrates and liquid crystal provided between the two substrates, and the noise canceling signal has an amplitude and a phase that are equal to an amplitude and a phase of a driving signal which influences electric charge existing between the liquid crystal panel and the one or more conductive thin plates.

8. The display system according to claim 1, wherein the display section of the display device is a liquid crystal panel which has two substrates and liquid crystal provided between the two substrates, a thin film transistor is provided on a substrate of the two substrates which is positioned further from the one or more conductive thin plates, and the noise canceling signal has an amplitude and a phase that are equal to an amplitude and a phase of a driving signal applied to a substrate of the two substrates which is positioned closer to the one or more conductive thin plates.

* * * * *